United States Patent [19]

Wine

[11] Patent Number: 4,685,134

[45] Date of Patent: Aug. 4, 1987

[54] MULTICHANNEL COMPUTER GENERATED SOUND SYNTHESIS SYSTEM

[75] Inventor: Charles M. Wine, Mercer County, N.J.

[73] Assignee: RCA Corporation, Princeton, N.J.

[21] Appl. No.: 756,836

[22] Filed: Jul. 19, 1985

[51] Int. Cl.[4] .......................... H04R 5/00; H04B 3/00

[52] U.S. Cl. ................................ 381/17; 84/DIG. 1; 84/DIG. 27; 84/1.24; 381/81

[58] Field of Search ............... 84/1.03, DIG. 27, 1.19, 84/DIG. 1, 1.26, 1.24; 381/62, 63, 81, 61, 1, 17

[56] References Cited

U.S. PATENT DOCUMENTS

| | | | |
|---|---|---|---|
| 3,219,757 | 11/1965 | Palladino | 179/1 |
| 3,222,899 | 5/1967 | Renwick, Jr. | 179/1 |
| 3,560,656 | 2/1971 | Gilbert | 179/1 |
| 3,670,106 | 6/1972 | Orban | 179/1 |
| 4,188,504 | 2/1980 | Kasuga et al. | 179/1 |
| 4,202,236 | 5/1980 | Wilcox et al. | 84/1.26 |
| 4,208,546 | 6/1980 | Laupman | 179/1 |
| 4,271,742 | 6/1981 | Sakashita et al. | 84/1.26 |
| 4,404,427 | 9/1983 | Blackmer | 179/1 |
| 4,476,765 | 10/1984 | Hentzschel et al. | 84/1.03 |
| 4,489,439 | 12/1984 | Scholz et al. | 381/63 |

*Primary Examiner*—Forester W. Isen
*Attorney, Agent, or Firm*—Joseph S. Tripoli; Allen LeRoy Limberg

[57] ABSTRACT

A system capable of synthesizing multi-channel sound for a computer includes a sound generator for each audio channel. A circuit provides a programmable delay so that one generator produces sound in one channel that is delayed with respect to the sound in the other channel. Multiple generators may be provided in each channel with each such generator having an independently programmable delay circuit associated therewith.

17 Claims, 2 Drawing Figures

MULTICHANNEL COMPUTER GENERATED SOUND SYNTHESIS SYSTEM

The present invention relates to the generation of sound by computers.

BACKGROUND OF THE INVENTION

Personal computers and computer systems used for video games often include means for generating sound effects. This can be a simple amplifier and speaker to which the computer supplies bit streams of digital data to generate crude sounds or this may consist of special purpose integrated circuits to synthesize various sound effects and music. Heretofore, most of the sound generated for personal computer type applications has been monaural. As the quality of the video images for such applications improves, the need for more realistic sound effects increases, necessitating the capability for multichannel sound.

In the case of stereophonic, or two channel sound, each channel does not consist of two totally different sounds, each being present only in one of the two channels. Rather, true stereophonic sound has essentially the same overall sound present in each channel with various component sounds being at different audio levels and different phase relationships from the same component present in the other audio channel. Therefore, simply providing separate sound generators for each channel will not synthesize true stereophonic audio.

SUMMARY OF THE INVENTION

A multichannel sound synthesis system for computer generated sounds has an audio signal generator for creating signals representing the sound for each channel. Each of these generators has an input for selecting the sound to be synthesized and another input for designating when the generator is to start outputting the audio signal. A delay means is included for delaying the start input signal which is applied to at least one of the sound generators.

DETAILED DESCRIPTION OF THE PREFERRED EMBODIMENT

Figure 1:
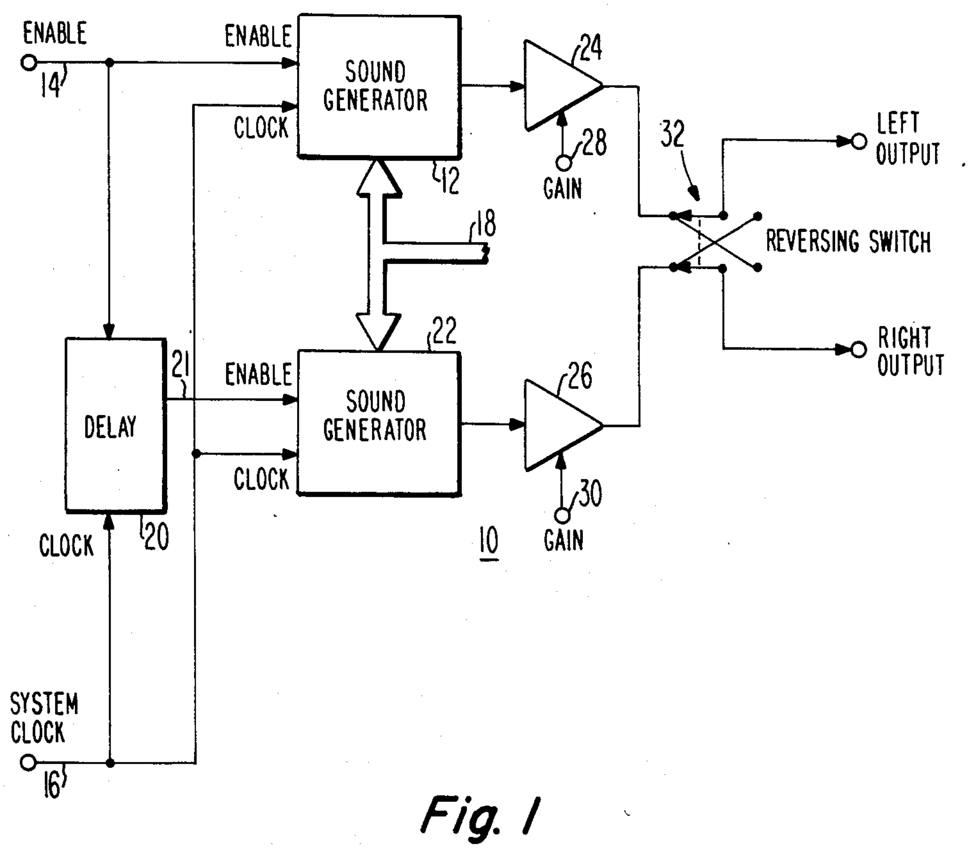
FIG. 1 shows the block diagram of one embodiment of a sound synthesis system according to the present invention.

With reference to FIG. 1, a multi-channel sound synthesis system 10 is part of a larger computer system which is not shown. Although the present invention is described in terms of two output channels (i.e., stereophonic), it may be easily adapted to a system having more channels. The sound synthesis system includes first and second sound generators 12 and 22 each capable of producing an output electrical signal in the audio frequency range. Each such sound generator may comprise any of several commercially available music or sound effects synthesizer integrated circuits which are computer controllable, such as the SN76495 manufactured by Texas Instruments, Inc. Alternatively, the generators may be part or all of a general purpose computing device. Each sound generator 12 and 22 is connected to the data bus 18 for the computer system and has a clock input terminal connected to the synthesizer system clock terminal 16. The clock terminal 16 may be coupled to the clock for the computer or to a separate clock for only the synthesizer. The first sound generator 12 has an enable input terminal directly connected to the enable signal terminal 14 for the synthesis system.

The enable signal terminal 14 is also connected to the input of a delay circuit 20. The delay circuit may consist of a digital counter having its enable terminal connected to terminal 14 and an output terminal connected to the enable terminal of the second sound generator 22. An example of a suitable computer controlled delay circuit is the 8253 Programmable Interval Timer sold by Intel Corp. The delay circuit 20 has a clock input connected to terminal 16. The delay circuit counts the clock pulses and produces an output signal after a given number of pulses have been counted. This given number may be a constant or a programmable number depending upon the type of counter used.

The outputs of the first and second sound generators 12 and 22 are respectively connected one of the first or second amplifier 24 and 26. Each amplifier 24 and 26 has variable gain control input terminals 28 and 30, respectively, which receive a control signal from the computer system. The output of each of the amplifiers 24 and 26 is coupled to an electronic double-pole, double-throw switch 32 so that the output of each amplifier may be connected to either the left or the right output channel depending upon the position of the channel reversing switch 32. The CD4016 circuit available from RCA Corp. is suitable for use as switch 32. Alternatively, sound generators 12 and 22 can be programmed to produce individually selected output amplitudes.

During the operation of the multi-channel sound synthesis system 10, data is supplied to the system via the computer data bus 18 to program the first generator 12 for the particular sound effect which is desired. The computer then supplies an enable (or start) pulse to terminal 14 which enables the first sound generator 12 to produce a audio signal at its output as long as the enable pulse is present. The clock signal is used by the sound generator as a timing signal. The audio output from the first generator 12 is amplified by the first amplifier 24 based on the gain control signal supplied at terminal 28. This amplified output is then fed through switch 32 to the coupled output channel, such as the left channel as shown in FIG. 1.

The enable pulse which was supplied to terminal 14 is fed to the delay circuit 20 and appears at the output line 21 a given number of clock periods later. This delayed output pulse is fed to the second sound generator 22 causing it to create a second audio signal at its output. The sound effect produced by the second generator 22 is determined by the digital word present on the data bus 18 when the enable signal from the delay circuit 20 is applied to the generator. For simulated stereo, this word is the same as that applied to the first generator 12. For other sound effects, the digital word may be different so as to produce a distinct audio signal in each channel. This second audio output signal is amplified by the second amplifier 26 based on the amplification control signal supplied at terminal 30 and then is supplied to the other output channel, in this case the right channel as shown in FIG. 1. The sound produced at the right output channel will be delayed slightly and possibly amplified to a different level as compared to the audio signal at the left output channel.

The sound synthesis system 10 may be used to create a variety of different sound effects. For example, the sound generators 12 and 22 may be programmed to emit the same or different audio signals by supplying different data to them via bus 18. The delay interval provided by circuit 20 may be changed from one sound effect to another if a programmable counter is used. In addition, the gain controls of the first and second amplifiers 24 and 26 may be independently varied to produce output signals having various volume relationships and may be instantaneously varied during the output period of the sound generators. The reversing switch 32 may change positions so that the sound in the left channel is delayed with respect to the sound in the right channel.

Figure 2:
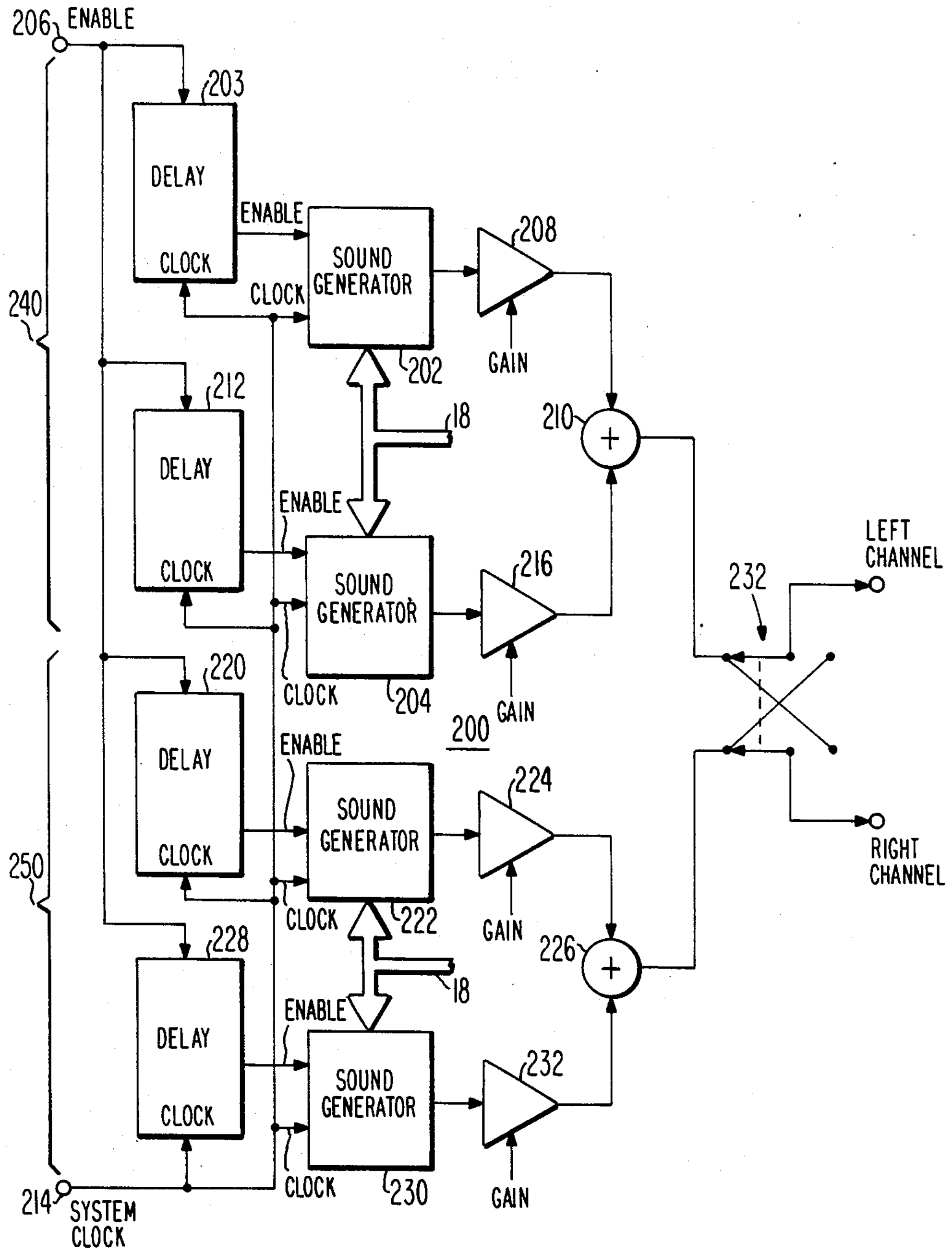
FIG. 2 is a block diagram of another embodiment of the present invention.

An alternative embodiment 200 of the present invention employing two sound generators for each channel is shown in FIG. 2. As with the first example, an alternative system may provide more than two channels, as well as use more than two generators per channel.

The first generator channel 240 includes first and second sound generators 202 and 204 respectively. The enable input terminal of the first sound generator is connected via first delay circuit 203 to the enable signal terminal 206 for the synthesizer 200. The output of the first generator 202 is fed to a first variable gain amplifier 208 whose output is connected to one input of a first summing circuit 210.

The first channel also comprises a second delay counter circuit 212. The second delay circuit receives the enable signal from terminal 206 and the clock signal from the system clock is applied to terminal 214. The output of delay 212 is coupled to the enable input of the second sound generator 204. The first and second sound generators are also connected to the clock signal terminal 214 and to the computer data bus 18. The audio output signal from the second generator 204 is fed via amplifier 216 to another input terminal of summing circuit 210.

The output of the first summing circuit 210 is connected to one pole of a double-pole, double-throw electronic switch 232 which alternatively couples the audio from the generator channels to either the right or left output terminals.

The second generator channel 250 comprises a third delay counter circuit 220 which delays the enable signal. The output of the third delay circuit is connected to the enable input of a third sound generator 222. The output of the third generator is amplified by amplifier 224 and fed to one input of a second summing circuit 226 whose output is coupled to the other pole of switch 232. Also included in the second channel is a fourth delay circuit 228 having inputs connected to the enable terminal 206 and the clock terminal 214. A fourth sound generator 230 has its enable input terminal coupled to the output of the third delay circuit. Both the third and fourth generators 222 and 230 receive the clock signal from terminal 214 and are connected to the computer data bus 18. The output of the fourth generator is fed through amplifier 232 to the other input terminal of the second summing circuit 226.

In the embodiment in FIG. 2, each channel 240 and 250 has two sound generators so that complex audio signals may be produced. This enables the synthesis of more realistic stereophonic sound in that one sound generator 202 or 222 in each channel, may create sounds originating in that channel. The other generator 204 or 230 in each channel can synthesize the sound originating in the other channel with a time delay and less amplification. In another version of the present invention, each channel may include a sound effects generator and a music or speech synthesizer with the outputs being mixed in the summing circuits. Since each generator in the FIG. 2 embodiment receives its enable signal from a delay circuit, the phase relationship between the output signals of the generators may be varied by using programmable counters to further increase the complexity of the synthesized audio.

I claim:

1. A multi-channel output sound synthesis system, comprising:

an enable terminal for the application of a signal indicating when the sound synthesis is to occur;

first and second means for generating first and second audio signals respectively, each generating means having a first input terminal for receiving a signal indicating when the sound generation is to occur and an output terminal;

means for coupling the first input terminal of said first generating means to said enable terminal; and delay means coupled to said enable terminal for delaying the signal indicating when sound synthesis is to occur, the delayed signal being coupled to the first input terminal of said second generating means, wherein said delay means comprises a counter.

2. The system as in claim 1 wherein said delay means has a variable delay period.

3. The system as in claim 1 wherein said means for coupling comprises a second means for delaying the signal indicating when sound synthesis is to occur, the delayed signal from said second means being applied to the first input terminal of said first generating means.

4. A multi-channel output sound synthesis system, comprising:

an enable terminal for the application of a signal indicating when the sound synthesis is to occur;

first and second means for generating first and second audio signals respectively, each generating means having a respective first input terminal for receiving a signal indicating when the sound generation is to occur, a respective second input terminal receptive of a signal for selecting one of several audio signals to be produced, and a respective output terminal;

means for coupling the first input terminal of said first generating means to said enable terminal; and first means coupled to said enable terminal for delaying the signal indicating when sound synthesis is to occur, the delayed signal being coupled to the first input terminal of said second generating means.

5. The system as in claim 4 wherein said coupling means comprises a second means for delaying the signal indicating when sound synthesis is to occur, the delayed signal from said second means being applied to the first input terminal of said first generating means.

6. The system as in claim 4 wherein said first means coupled to said enable terminal comprises a counter.

7. The system as in claim 4 wherein said first means coupled to said enable terminal has a variable delay period.

8. A multi-channel output sound synthesis system comprising an enable terminal and a plurality of audio channels each having an audio signal output terminal; wherein each audio channel comprises:

first and second means for generating audio signals, each generating means having a first input terminal receptive of a signal for selecting the sound to be generated, second input terminal for receiving a signal indicating when the start of the sound generation is to occur, and an output terminal;

means for coupling the second input terminal of said first generating means to said enable terminal;

first means coupled to said enable terminal for delaying the signal indicating when the start of sound synthesis is to occur, the delayed signal being coupled to the second input terminal of said second generating means; and means coupled to said first and second generating means output terminals for combining the outputs of the first and second generating means at said audio signal output terminal.

9. The system as in claim 8 wherein said means for coupling the second input terminal of said first generating means to said enable terminal comprises a second means coupled to said enable terminal for delaying the signal indicating when the start of the sound synthesis is to occur, the delayed output of the second means being coupled to the second input terminal of said first generating means.

10. The system as in claim 9 wherein said first and second delay means have a variable delay period.

11. The system as in claim 8 wherein said first delay means has a variable delay period.

12. The system as in claim 8 further comprising:

a plurality of system output terminals; and means for selectively switching the output of each of said channels to a different one of said system output terminals.

13. A multiple-channel-output synthesis system comprising:

an enable terminal for the application of a signal indicating when the sound synthesis is to occur;

first and second means for generating first and second audio signals respectively, each generating means having a first input terminal for receiving a signal indicating when the sound generation is to occur and an output terminal;

means for coupling the first input terminal of said first generating means to said enable terminal;

first means coupled to said enable terminal for delaying the signal indicating when sound synthesis is to occur, the delayed signal being coupled to the first input terminal of said second generating means;

a plurality of audio output terminals for said system; and means for selectively coupling the output terminals of the first and second generating means to different audio output terminals of said system.

14. The system as in claim 13 wherein said first means coupled to said enable terminal comprises a counter.

15. The system as in claim 13 wherein said first means coupled to said enable terminal has a variable delay period.

16. A multi-channel sound synthesis system as in claim 13 wherein the first and second generating means each include a second input terminal receptive of a signal for selecting one of several audio signals to be produced.

17. The system as in claim 13 wherein said means for coupling comprises a second means for delaying the signal indicating when sound synthesis is to occur, the delayed signal from said second means being applied to the first input terminal of said first generating means.

* * * * *